US009141298B2

(12) United States Patent
Sankar et al.

(10) Patent No.: US 9,141,298 B2
(45) Date of Patent: *Sep. 22, 2015

(54) SOLID-STATE DRIVE MANAGEMENT AND CONTROL

(71) Applicant: Microsoft Corporation, Redmond, WA (US)

(72) Inventors: Sriram Sankar, Kirkland, WA (US); Badriddine Khessib, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/488,222

(22) Filed: Sep. 16, 2014

(65) Prior Publication Data

US 2015/0006799 A1 Jan. 1, 2015

Related U.S. Application Data

(63) Continuation of application No. 13/450,480, filed on Apr. 19, 2012, now Pat. No. 8,868,824.

(51) Int. Cl.
*G06F 3/06* (2006.01)
(52) U.S. Cl.
CPC .............. *G06F 3/0619* (2013.01); *G06F 3/061* (2013.01); *G06F 3/0604* (2013.01); *G06F 3/065* (2013.01); *G06F 3/0629* (2013.01); *G06F 3/0632* (2013.01); *G06F 3/0679* (2013.01); *G06F 2206/1014* (2013.01); *G06F 2212/7211* (2013.01)

(58) Field of Classification Search
CPC .................... G06F 12/0246; G06F 2212/7211
USPC ......................................................... 711/103
See application file for complete search history.

(56) References Cited

U.S. PATENT DOCUMENTS

| | | | |
|---|---|---|---|
| 2007/0103992 A1* | 5/2007 | Sakui et al. | 365/185.33 |
| 2007/0180186 A1* | 8/2007 | Cornwell et al. | 711/103 |
| 2007/0180328 A1* | 8/2007 | Cornwell et al. | 714/42 |

(Continued)

OTHER PUBLICATIONS

Vasudevan, Vijay R., "Energy-efficient Data-intensive Computing with a Fast Array of Wimpy Nodes", Retrieved at <<http://vijay.vasu.org/static/papers/vijay_dissertation.pdf>>, Oct. 2011, pp. 154.

(Continued)

*Primary Examiner* — Ryan Bertram
(74) *Attorney, Agent, or Firm* — Brian Haslam; Kate Drakos; Micky Minhas

(57) ABSTRACT

Various techniques of solid-state drive ("SSD") management systems, components, modules, routines, and processes are described in this application. In one embodiment, a management engine for controlling a solid-state drive includes an input interface configured to receive a target operation profile from an input source. The management engine also includes a process component g configured to receive the target operation profile from the input interface, retrieve an operating policy from a database based on the target operation profile, and determine operating parameters for the SSD based on the retrieved operating policy. The management engine further includes a device interface coupled to the process component, the device interface being configured to transmit the determined operating parameters to the SSD for controlling operation of the SSD.

20 Claims, 7 Drawing Sheets

(56) References Cited

U.S. PATENT DOCUMENTS

| | | | |
|---|---|---|---|
| 2009/0100215 A1* | 4/2009 | Nochimowski | 711/103 |
| 2009/0213655 A1* | 8/2009 | Roohparvar | 365/185.05 |
| 2009/0327590 A1 | 12/2009 | Moshayedi | |
| 2011/0110158 A1 | 5/2011 | Schuette | |
| 2011/0138103 A1 | 6/2011 | Iliadis et al. | |
| 2012/0084490 A1* | 4/2012 | Choi et al. | 711/103 |
| 2012/0278527 A1* | 11/2012 | Cho et al. | 711/103 |

OTHER PUBLICATIONS

"NAND Evolution and its Effects on Solid State Drive (SSD) Useable Life", Retrieved at <<http://www.wdc.com/WDProducts/SSD/whitepapers/en/NAND_Evolution_0812.pdf>>, Jan. 2009, pp. 16.

Mohan, et al., "How I Learned to Stop Worrying and Love Flash Endurance", Retrieved at <<http://www.usenix.org/event/hotstorage10/tech/full_papers/Mohan.pdf>>,Proceedings of 2nd USENIX conference on hot topics in storage and file systems, Jun. 2010, pp. 5.

Spanjer, Esther, "Flash Management—Why and How?", Retrieved at<<http://www.smartm.com/files/salesLiterature/storage/Flash%20Management_WhyHow.pdf>>, Nov. 2009, pp. 14.

Wu, et al., "Exploiting Heat-Accelerated Flash Memory Wear-Out Recovery to Enable Self-Healing SSDs", Retrieved at<<http://www.usenix.org/events/hotstorage11/tech/final_files/Wu.pdf>>, Proceedings of 3rd USENIX conference on hot topics in storage and file systems, Jun. 2011, pp. 5.

* cited by examiner

SOLID-STATE DRIVE MANAGEMENT AND CONTROL

CROSS-REFERENCE TO RELATED APPLICATION(S)

This application is a continuation application of U.S. patent application Ser. No. 13/450,480, filed on Apr. 19, 2012, the disclosure of which is incorporated herein in its entirety.

BACKGROUND

Network servers, personal computers, and other computing devices typically include at least one persistent storage device for retaining digital data. Various types of persistent storage devices are currently available. For example, one type includes hard disk drives ("HDDs"), optical disc drives (e.g., DVD-ROMs), and other electromechanical storage devices. Another type includes flash drives and other solid-state drives ("SSDs") that electrically store digital data without moving mechanical parts.

SSDs typically are faster (i.e., with lower latencies) and less susceptible to physical shocks than electromechanical storage devices. On the other hand, conventional electromechanical storage devices (e.g., HDDs) are typically cheaper than SSDs at similar capacity levels. However, as semiconductor-manufacturing techniques progress, manufacturing costs of SSDs continue to fall. As a result, SSDs are now a feasible option for desktop and/or network storage applications.

SUMMARY

The present technology is directed to management and/or control of operational characteristics of SSDs at an operating system and/or application layer. In one aspect, the present technology provides a management engine as a part of an operating system and/or application for setting operating parameters of SSDs based on a target operation profile. For example, the management engine can include an input interface configured to accept input of endurance, retention, performance, and/or other target operation profiles from an operator and/or application. The management engine can also include a process component configured to determine one or more operating parameters for SSDs based on the received input and predetermined operating policies. Example operating parameters can include cell recovery time, retention period, wear leveling, and/or other suitable operating parameters. The management engine can further include a device interface configured to transmit the determined operating parameters to the SSDs.

In another aspect, the present technology provides a method of managing and/or controlling operational characteristics of SSDs based on predetermined policies. For example, in one embodiment, the method may include accepting an indication from an input source (e.g., a human operator, computing hardware, firmware, or computer application) for a target operation profile (e.g., high endurance, high retention, or high performance). The method then includes determining one or more operating parameters for SSDs based on predetermined operating policies for achieving the target operation profile. For example, if the target operational profile is high endurance, then a predetermined value may be individually set for cell recovery time, retention period, wear leveling, and/or other suitable operating parameters of SSDs. If the target operation profile is changed to high retention, then a different value may be set for at least one of the foregoing operating parameters. In certain embodiments, the operator and/or computer application may modify the operating policies. In other embodiments, the predetermined policies may not be modified.

In a further aspect, the present technology provides an SSD with an SSD component configured to interact with an operating system and/or application via an SSD interface. In certain embodiments, the SSD component is configured to accept set values for retention, recovery period, wear leveling, programming time, and/or other operating parameters. In other embodiments, the SSD component can also be configured to respond to queries of SSD operating conditions from the operating system and/or application. Responses to the queries can include current and/or historical values of wear endurance, write traffic, voltage level of sector(s) or entire device of the SSD component, number of dead blocks, bit storage configuration, and/or other suitable operating conditions of the SSD.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
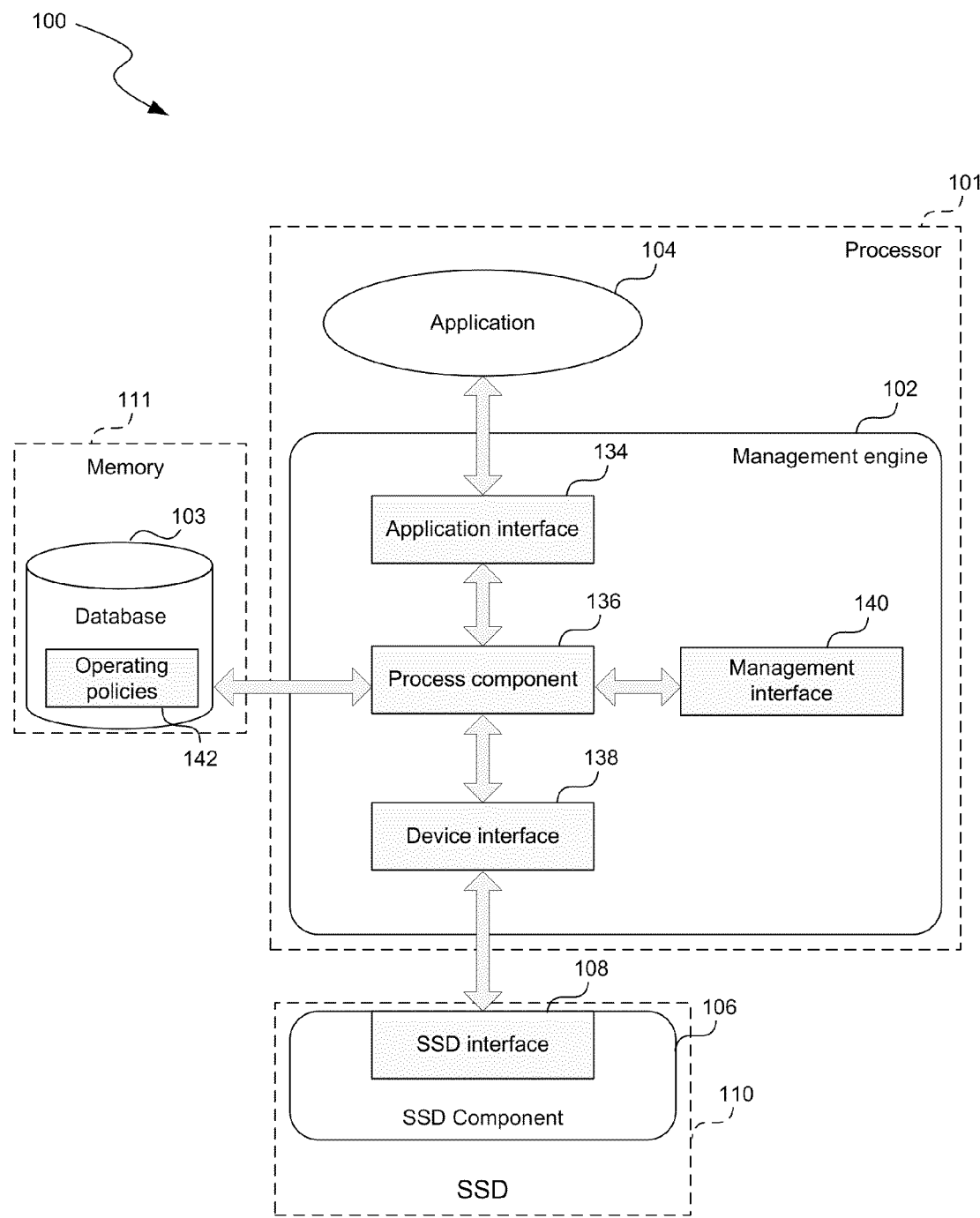
FIG. 1 is a schematic block diagram illustrating hardware and software components of a SSD management system in accordance with embodiments of the present technology.

Various embodiments of SSD management systems, devices, components, modules, routines, and processes are described below. In the following description, example software codes, values, and other specific details are included to provide a thorough understanding of various embodiments of the present technology. A person skilled in the relevant art will also understand that the technology may have additional embodiments. The technology may also be practiced without several of the details of the embodiments described below with reference to FIGS. 1-8.

As discussed in the Background section, SSDs are now a feasible option for desktop and/or network storage applications. As used herein, the term "SSD" generally refers to a persistent solid-state storage device configured to store digital data electrically. Examples of an SSD can include a NAND flash device, a NOR flash device, or an EEPROM device. The inventors have recognized that SSDs have operating tradeoffs among endurance, retention, performance, and other suitable operating characteristics. For example, SSDs can have high performance (e.g., fast read/write or low latencies) but low endurance, or vice versa. As used herein, the term "endurance" generally refers to a limit in time at which writing to an SSD is no longer reliable. The terms "retention" generally refers to a limit in time at which reading from an SSD is no longer reliable. The term "performance" generally refers to a speed at which an SSD is read from and/or written to.

Without being bound by theory, it is believed that such operating tradeoffs are results of physical limitations of SSDs. For example, SSDs typically store digital data in an array of cells individually having a floating-gate transistor. In single-level cell ("SLC") SSDs, each cell stores one bit of digital data by holding a certain amount of electrical charge. In multi-level cell ("MLC") SSDs, each cell can store more than one bit by holding multiple levels of electrical charge. If a period between two successive writes to a cell is small, electrons and/or other charge carriers may be trapped in insulating materials (e.g., oxides) of the floating-gate transistor. As used herein, the phrase "cell recovery time" is defined as the period between two successive writes to a cell. The trapped charges may cause current leakage, operating voltage deviation, and/or other operating phenomena, eventually resulting in failure of the cell. Thus, operating SSDs for high performance may result in low endurance and/or retention. On the other hand, if the cell recovery time is sufficiently long (e.g., slow read/write), electrons and/or other charge carriers may escape from the insulating materials, and thus resulting in high endurance but low performance.

The inventors have recognized that different computing tasks assigned to a computing device may require different tradeoffs of SSDs coupled to the computing device as persistent storage. For instance, time sensitive tasks (e.g., web search) may require high performance, while other tasks (e.g., data backup) may require high endurance. Currently, it is believed that operating characteristics of SSDs are set during manufacturing and may not be altered during operation. Thus, a mismatch may exist between operating characteristics of SSDs and computing task demands. Several embodiments of the technology discussed below are directed to managing the foregoing tradeoffs of SSDs based on computing task demands, and thus prolonging usable life of SSDs, reducing costs of using SSDs as storage devices, and improving operation performance of computing devices when compared to conventional techniques.

FIG. 1 is a schematic block diagram illustrating hardware and software components of a SSD management system 100. In the illustrated embodiment, the SSD management system 100 can include a processor 101, a memory 111, and an SSD 110 (shown in phantom lines for clarity) operatively coupled to one another. The processor 101 can include a microprocessor, a field-programmable gate array, and/or other suitable logic-processing component. The memory 111 can include a read-only memory, random-access memory, magnetic disk storage media, optical storage media, flash memory devices configured to store data received from, as well as instructions for, the processor 101. However, the memory 111 does not include propagated signals per se. The SSD 110 can include NAND, NOR, or other suitable types of solid-state storage elements. The SSD 110 can also include a hybrid storage device having a solid-state storage element, an electromechanical storage element (e.g., HDD), and/or other suitable types of storage element. In other embodiments, the memory 111 may be omitted, and the SSD 110 may store data received from, as well as instructions for, the processor 101.

As shown in FIG. 1, the SSD management system 100 can also include suitable software components, for example, a management engine 102, a database 103, an SSD component 106 having an SSD interface 108, and an optional application 104 operatively coupled to one another. In FIG. 1 and in other Figures hereinafter, the foregoing and other software components, modules, and/or routines may include a computer program, procedure, or process written as source code in C, C++, Java, and/or other suitable programming languages. The computer program, procedure, or process may be compiled into object or machine code and presented for execution by a processor (e.g., the processor 101) of a personal computer, a network server, a laptop computer, a smart phone, and/or other suitable computing devices. Various implementations of the source and/or object code and associated data may be stored in a computer memory (e.g., memory 111 and/or SSD 110). Even though FIG. 1 only shows the foregoing hardware and software components, in further embodiments, the SSD management system 100 may also include a display, an input/output component, and/or other suitable hardware or software components.

In certain embodiments, the foregoing software components of the SSD management system 100 may reside in a single computing device, for example, with the processor 101 coupled to the memory 111 and SSD 110. In other embodiments, at least one of the foregoing components may reside in a distributed computing environment. For example, the application 104 may reside in a remote computing device (e.g., a remote server, not shown) coupled to the processor 101 via a suitable network (e.g., the Internet, not shown). In further embodiments, the foregoing software components may have other suitable arrangements.

The optional application 104 can be configured to provide a target operation profile for the SSD 110 to the management engine 102 based on suitable criteria. For example, in one embodiment, the application 104 can include a finite-state machine configured to output an indicator of endurance, retention, or performance to the management engine 102 based on a status of currently running application(s), a configuration file, flag, user input, and/or other suitable information. For instance, the finite-state machine may output a new indicator when a currently running application is different from a previous one without requiring a human operator to explicitly request such a setting change. In further embodiments, the optional application 104 can also include abstract state machines, control tables, decision tables, state diagram, and/or other suitable components. In yet further embodiments, the optional application 104 may be omitted.

The database 103 can be configured to store operating policies 142 for the SSD 110. In one embodiment, the operation policies 142 can individually include a data record containing data fields for storing values of policy identification, retention setting, recovery period, wear leveling setting, programming time, and/or other suitable information. An example data record is described in more detail below with reference to FIG. 7. In other embodiments, operating policies 142 can also include conflict checking, priority settings, and/or other suitable data and/or instructions. In further embodiments, the database 103 can also store operating conditions of the SSD 110 as discussed in more detail below. Even though the database 103 is shown to reside in the memory 111 in FIG. 1, in other embodiments, the database 103 may at least partially or may entirely reside in the SSD 110.

The management engine 102 can be configured to manage and/or control operations of the SSD 110 based on a target operation profile. As shown in FIG. 1, the management engine 102 can include a process component 136, a management interface 140, a device interface 138, and an optional application interface 134 coupled to one another. The management interface 140 and the optional application interface 134 are referred to herein generically as "input interface." In one embodiment, the management engine 102 can be a part of an operating system (e.g., Microsoft Windows™). In another embodiment, the management engine 102 can be a standalone application executable in an operating system. In further embodiments, some components (e.g., the process component 136) of the management engine 102 can be embedded in an operating system while others (e.g., the management interface 140) can be configured as a standalone application. In yet further embodiments, the management engine 102 can have other suitable arrangements.

The optional application interface 134 is configured to receive a target operation profile for the SSD 110 from the application 104. In one embodiment, the application interface 134 can include an application-programming interface ("API") based on suitable standards. For example, the API can have a specification conforming to Microsoft Windows™ API, a library of a programming language (e.g., the standard template library in C++ or Java API), or an international standard (e.g., portable operating system interface). In other embodiments, the application interface 134 may include other suitable types of interface or be omitted.

The process component 136 is configured to determine operating parameters for the SSD 110 based on input from an operator and/or the application 104 via the input interface. In certain embodiments, the process component 136 is configured to retrieve the operating policies 142 from the database 103. The process component 136 then determines a value for at least one of cell recovery time, retention period, wear leveling, and/or other suitable operating parameters of SSD 110 based on the target operation profile and the retrieved operating policies. In other embodiments, the process component 136 can also accept input from the operator and/or application 104 to modify the operating policies 142, and modify the operating policies 142 accordingly. Several embodiments of the process component 136 are described in more detail below with reference to FIG. 2.

The management interface 140 is configured to present options for as well as receive a target operation profile from an operator. In one embodiment, the management interface 140 can include a graphical user interface having scales, drop boxes, levers, expending lists, and/or other suitable graphical elements configured to present options for and receive operator indications. For instance, the management interface 140 can include a drop box that allows the operator to select one from a list of endurance, retention, performance, or other suitable operation profiles. In another instance, the management interface 140 can include mutually exclusive check boxes (or buttons) for the foregoing operation profiles. An example management interface 140 is described in more detail below with reference to FIG. 3. In other embodiments, the management interface 140 can include a text-based interface, typed command label, or text navigation component. In further embodiments, the management interface 140 can include a combination of graphical and text based elements.

The device interface 138 is configured to interact with the SSD interface 108 of the SSD component 106. In certain embodiments, the device interface 138 and/or the SSD interface 108 can be based on a standard API generally similar to the application interface 134. In other embodiments, the device interface 138 and/or the SSD interface 108 can include an API different from that of the application interface 134. In any of the foregoing embodiments, the device interface 138 and the SSD interface 108 are configured to transmit commands for setting operating parameters for the SSD 110. Example commands can include set_recovery_time, set_retention_period, set_wear_leveling, and/or other suitable commands. For example, the commands set_recovery_time and set_retention_period may set at least one of a maximum value, minimum value, average value, or allowed range for cell recovery time and retention period, respectively. The command set_wear_leveling may turn on (or off) dynamic or static wear leveling. In further embodiments, the device interface 138 and the SSD interface 108 can also be configured to allow query of operating conditions of the SSD 110. For example, a query may request current and/or historical values of wear endurance, write traffic, voltage threshold level, number of dead blocks, and/or other suitable operating conditions of the SSD 110.

The SSD component 106 is configured to receive operating parameters from the management engine 102 and control operation of the SSD 110 based on the received operating parameters. For example, in one embodiment, the SSD component 106 can include a flash memory controller ("FMC"). The FMC receives operating parameters from the management engine 102 via the SSD interface 108. Based on the received operating parameters, the FMC controls operations of accessing (e.g., reading, writing, and erasing), wear leveling (e.g., static, dynamic, or no wear leveling), block picking, garbage collection, and/or other suitable operations of the SSD 110. In other embodiments, the SSD component 106 can also include a buffer (not shown) for holding historical and/or other data. In further embodiments, the SSD component 106 can include other suitable hardware and/or software components.

In operation, the application 104 and/or an operator can provide a target operation profile for the SSD 110 to the management engine 102 via the application interface 134 or the management interface 140, respectively. After receiving the SSD target operation profile, the process component 136 retrieves operating policies 142 from the database 102. The process component 136 then compares the retrieved operating policies 142 with the target operation profile to determine operating parameters for the SSD 110. The process component 136 then transmits the determined operating parameters to the SSD component 106 via the device interface 138 and the SSD interface 108. The SSD component 106 then adjusts operation of the SSD 110 based on the received operating parameters.

Several embodiments of the SSD management system 100 can at least address some of the difficulties of using SSDs as storage media discussed above by adjusting operating characteristics of the SSDs based on application/user requirements. For example, time sensitive applications (e.g., web search) may require high performance. Thus, when a computing device is tasked to provide web-searching services, the application 104 and/or an operator may set the target operation profile for the SSD 110 to high performance. Later, when the same computing device is repurposed for other applications (e.g., data backup) that require high endurance, the application 104 alone, the operator, or a combination of the application 104 and the operator may set the target operation profile to high endurance. As a result, excessive wearing on the SSD 110 for operating at high performance may be at least reduced or avoided. Thus, the SSD 110 may have a prolonged usable life and improved operation performance when compared to conventional techniques.

Figure 2:
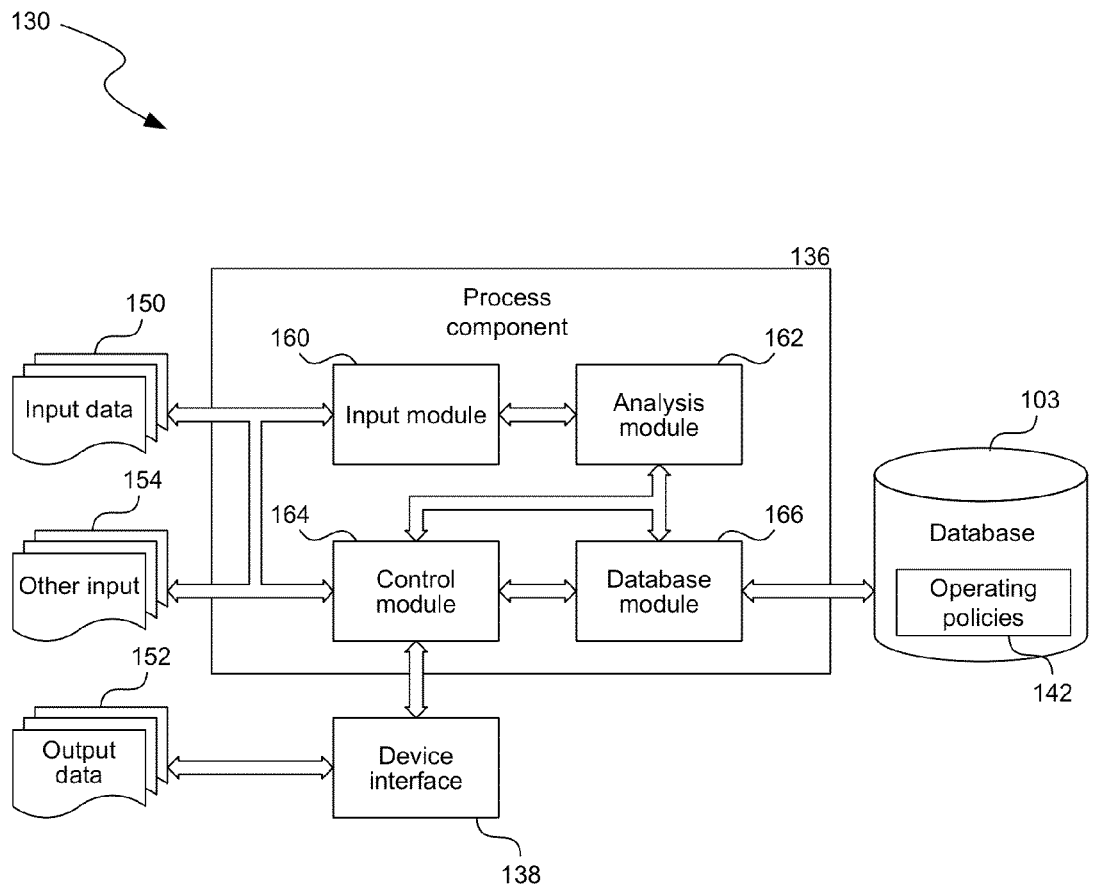
FIG. 2 is a block diagram showing computing components suitable for the process component of the management engine of FIG. 1 in accordance with embodiments of the present technology.

FIG. 2 is a block diagram showing computing components 130 suitable for the process component 136 of the management engine 102 in FIG. 1. As shown in FIG. 2, the process component 136 can include an input module 160, an analysis module 162, a control module 164, and a database module 166 interconnected with one other. Each module may be a computer program, procedure, or routine written as source code in a conventional programming language, or one or more modules may be hardware modules.

The input module 160 is configured to receive input data 150. For example, in certain embodiments, the input data 150 includes an indication of endurance, retention, performance, and/or other suitable operation profiles from the application 104 via the application interface 134 (FIG. 1). In other embodiments, the input data 150 includes an indication of operation profiles from an operator via the management interface 140 (FIG. 1). The input module 160 then transmits the received input data 150 to the analysis module 162.

The analysis module 162 can be configured to analyze the received input data 150 and identify a target operation profile for the SSD 110 (FIG. 1) based thereon. In one embodiment, the analysis module 162 may give priority to operation profile received from the operator. As a result, if the analysis module 162 detects a conflict between operation profiles from the application 104 and the operator, the analysis module 162 sets the target operation profile based on that received via the management interface 140. In another embodiment, the analysis module 162 may give priority to the application 104 over input from the operator. In further embodiments, the analysis module 162 may give priority to a particular application (e.g., the application 104) over other applications (not shown) of the computing component 130 based on time of request, time of day, and/or other suitable criteria.

The analysis module 162 can also be configured to correlate the desired operation profile to an operating policy 142 retrieved by the database module 166. For example, the analysis module 162 can search the retrieved operating policies 142 based on the target operation profile (e.g., endurance, retention, or performance). Once a particular operating policy 142 is identified, the analysis module 162 can determine operating parameters associated with the operating policy 142 before transmitting the determined operating parameters to the control module 164. In one example, the analysis module 162 can set the operating parameters with values contained in the operating policy 142. In other embodiments, the analysis module 162 can set the operating parameters to have values adjusted (e.g., with a factor) based on those in the operating policy 142. In further embodiments, the analysis module 162 may set the operating parameters in other suitable fashions.

The database module 166 is configured to organize records, including operating policies 142, and facilitate storing and retrieving of these records to and from the database 103. Any type of database organization may be utilized, including a flat file system, hierarchical database, relational database, or distributed database, such as provided by a database vendor such as the Microsoft Corporation, Redmond, Wash.

The control module 164 can be configured to control operation of the SSD 110 based on operating parameters determined by the analysis module 162. For example, in one embodiment, the control module 164 can generate output data 152 that include at least one command to set operating parameters for the SSD 110. The control module 164 can then communicate the commands containing the operating parameters to SSD 110 via the device interface 138. In other example, the control module 164 may enable, disable, put to sleep, and/or perform other suitable control operations to the SSD 110 based on other input 154.

Figure 3:
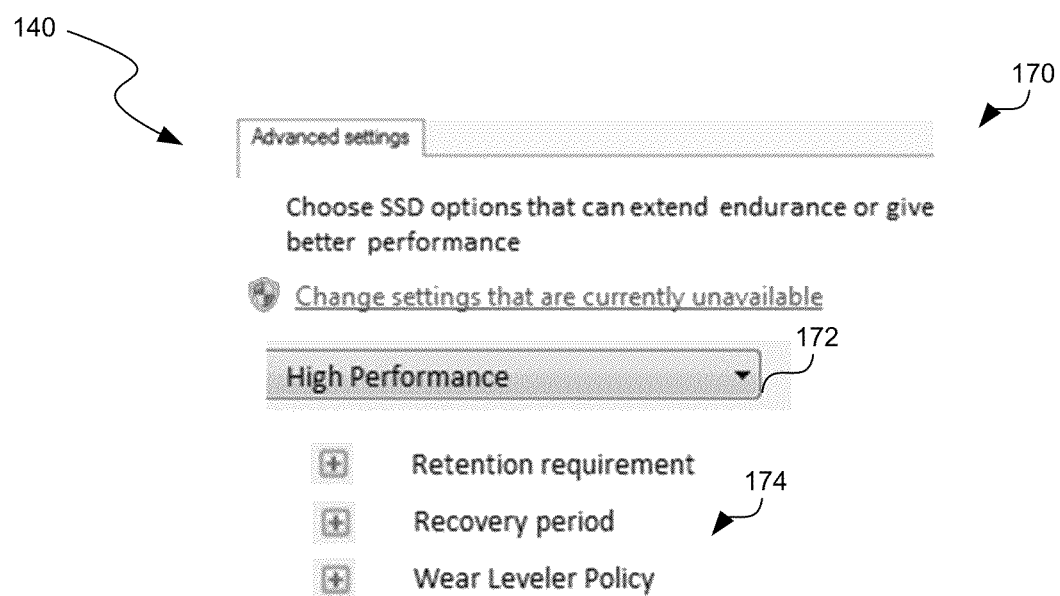
FIG. 3 is an example screen shot of a management interface suitable for the management engine of FIG. 1 in accordance with embodiments of the present technology.

FIG. 3 is an example screen shot of a management interface 140 suitable for the management engine 102 of FIG. 1 in accordance with embodiments of the present technology. As shown in FIG. 3, the management interface 140 can include a graphical user interface 170 with a drop box 172 for selecting a target operation profile and expandable buttons 174 for customizing the currently shown target operation profile. Thus, an operator can select an operation profile from a list included in the drop box 172. The operator may then inspect the various settings for the selected operation profile. If the operator is dissatisfied with any of the settings, the operator may expand the buttons 174 and modify appropriate settings. In the illustrated embodiment, "high performance" is shown in the drop box 172, and "retention requirement," "recovery period," and "wear leveler policy" are shown for the expandable buttons 174 for illustration purposes. In other embodiments, the management interface 140 can also include other suitable graphical or text based interfaces.

Figure 4:
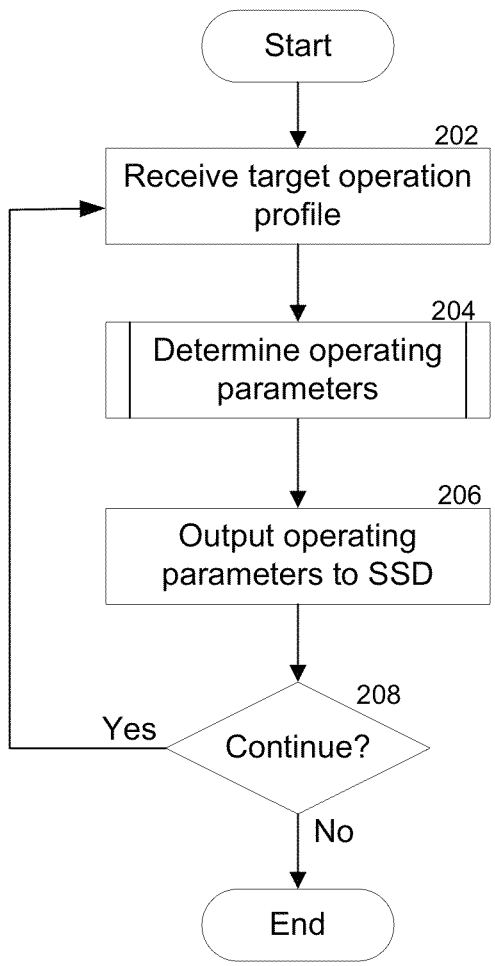
FIG. 4 is a flow diagram illustrating a process for managing an SSD in accordance with embodiments of the present technology.

FIG. 4 is a flow diagram illustrating a process 200 for managing an SSD in accordance with embodiments of the present technology. As shown in FIG. 4, the process 200 can include receiving a target operation profile at stage 202. The target operation profile can include at least one of endurance, retention, performance and/or other suitable operation characteristics of an SSD. In one embodiment, the target operation profile is received from an operator via a computer user interface. In another embodiment, the target operation profile is received via an API from an application. In further embodiments, the target operation profile can be received from other suitable sources.

The process 200 can also include determining operating parameters for an SSD based on the received target operation profile at stage 204. The operating parameters can include values for retention setting, recover period, wear leveling setting, programming time, and/or other suitable parameters of the SSD. In certain embodiments, the operating parameters can be determined based on predetermined operating policies for the SSD. In other embodiments, operating parameters can be determined based on other suitable data. Several embodiments of determining operating parameters are described in more detail below with reference to FIG. 5.

The process 200 can further include outputting the determined operating parameters to the SSD at stage 206. In one embodiment, the operating parameters can be output to the SSD via an SSD interface configured to communicate with an operating system and/or application. In other embodiments, the operating parameters may be otherwise transmitted to the SSD from the operating system and/or application. The SSD may then operate based on the received operating parameters.

The process 200 can then include a decision stage 208 to determine if the process continues. In one embodiment, the process continues if the computing device is still running. In other embodiments, the process may continue based on other suitable conditions. If the process continues, the process reverts to receiving target operation profile at stage 202; otherwise, the process ends.

Figure 5:
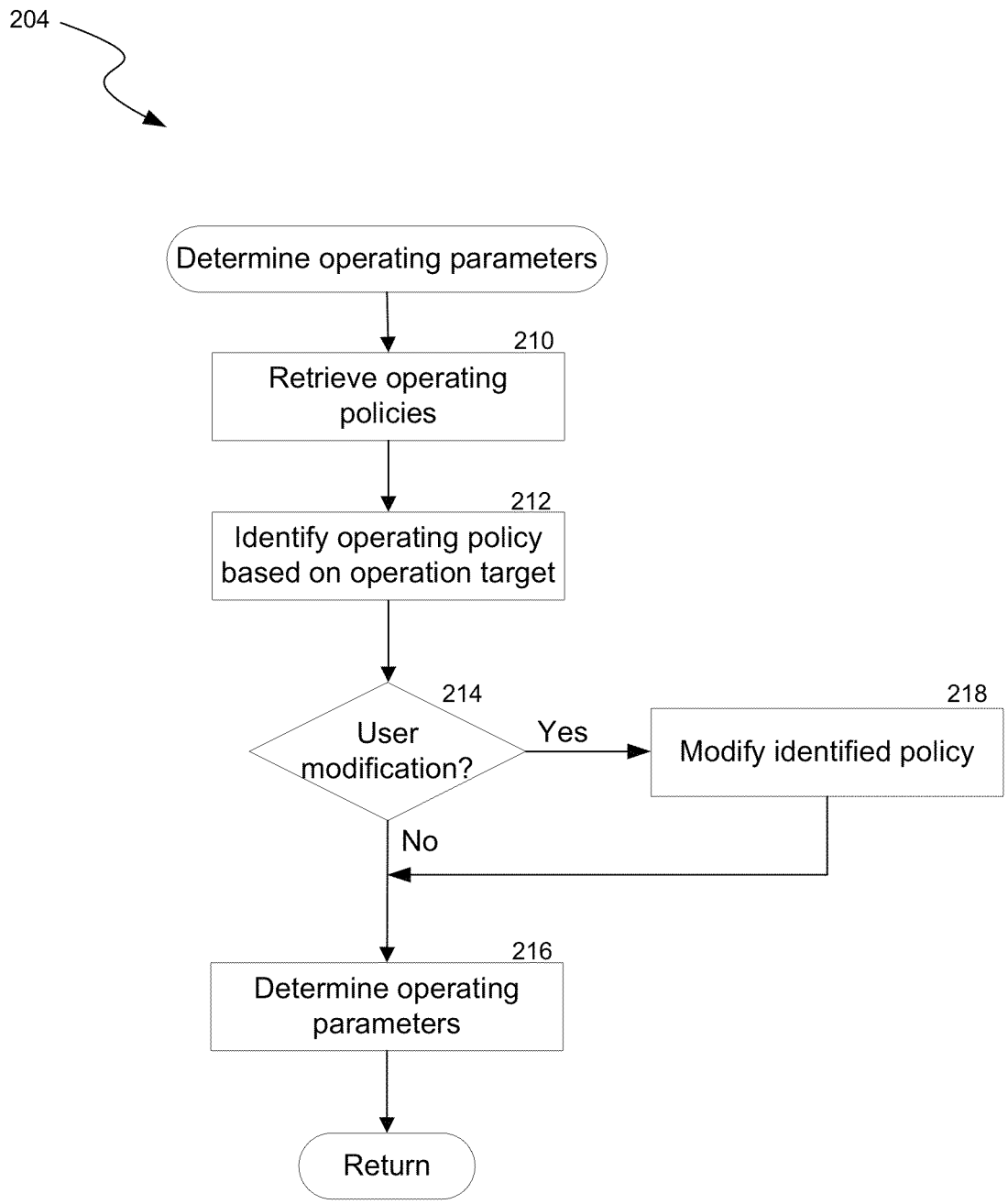
FIG. 5 is a flow diagram illustrating a process for determining operating parameters for an SSD in accordance with embodiments of the present technology.

FIG. 5 is a flow diagram illustrating a process 204 for determining operating parameters for an SSD in accordance with embodiments of the present technology. As shown in FIG. 5, the process 204 can include retrieving operating policies from a database at stage 210. The operating policies can individually include a set of values of operating parameters for an SSD. Example operating parameters can include cell recovery time, retention period, wear leveling, and/or other suitable operating parameters.

Process 204 can then include identifying a particular operating policy based on the target operation profile. For example, in one embodiment, if the target operation profile is high endurance, the process 204 can include searching the retrieved operating policies to identify a particular one with a policy ID that corresponds to high endurance. In other embodiments, the operating policy may be identified in other suitable fashion.

The process 204 can then include a decision stage 214 to determine if modification for the identified operating policy is received. The modification may be from an operator, an application, and/or other suitable sources. If modification is not received, the process 204 proceeds to determining operating parameters based on the identified operating policy at stage 216. If modification is received, process 204 includes modifying the identified operating policy and storing the modified operating policy in the database at stage 218. Then, the process 204 proceeds to determining operating parameters based on the identified policy at stage 216 before the process returns.

Figure 6:
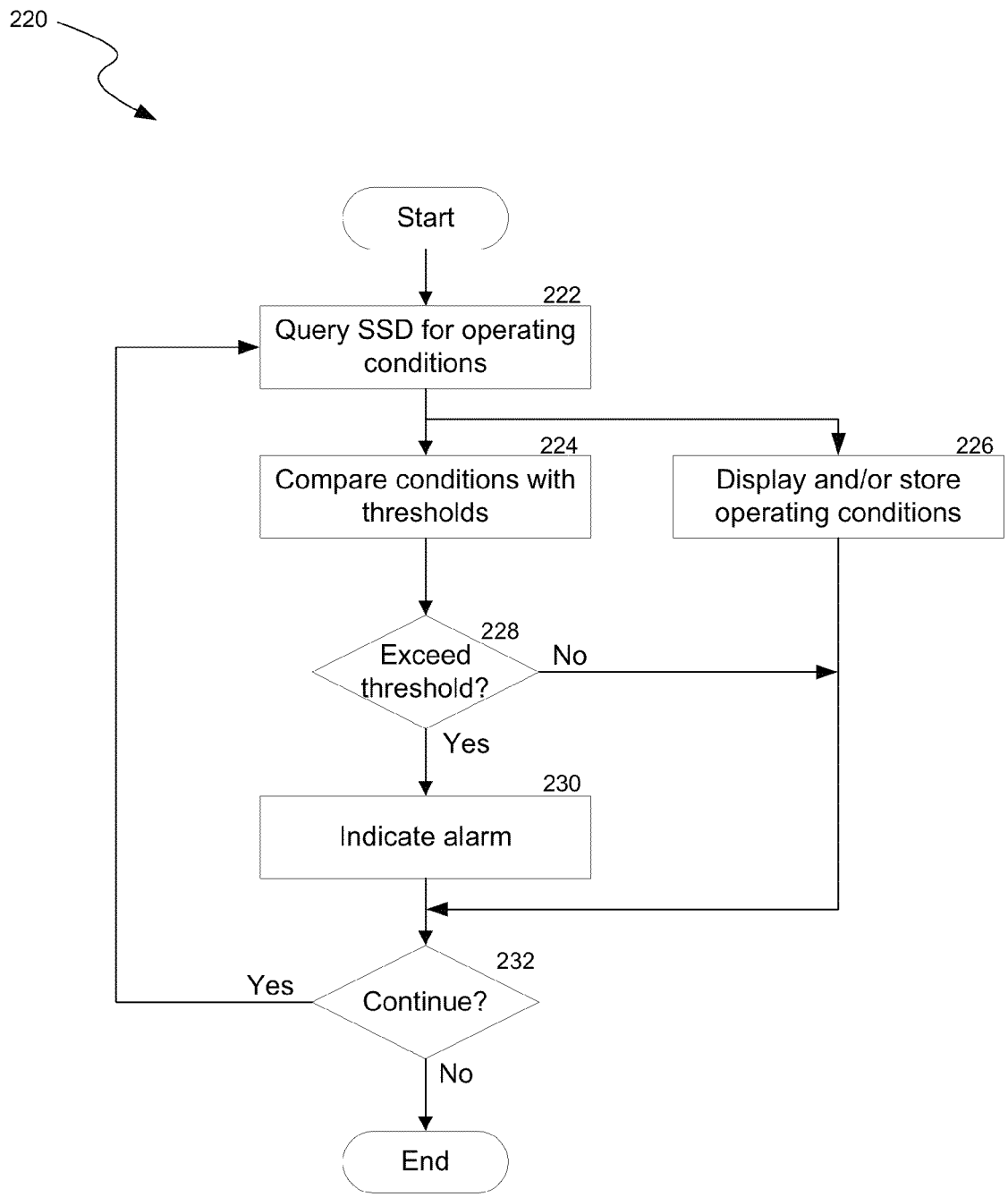
FIG. 6 is a flow diagram illustrating a process for monitoring operation of an SSD in accordance with embodiments of the present technology.

FIG. 6 is a flow diagram illustrating a process 220 for monitoring operation of an SSD in accordance with embodiments of the present technology. As shown in FIG. 6, the process 220 can include querying an SSD at stage 222. In one embodiment, querying the SSD can include transmitting a request for wear endurance, right traffic, voltage level, number of dead blocks, bit storage mode, and/or other suitable SSD operating conditions to the SSD. The process 220 then includes receiving the requested information from the SSD and optionally storing such information in a database at stage 226.

The process 220 can then include comparing the received operating conditions with corresponding thresholds at stage 224. The process 220 can then include a decision stage 228 to determine if any of the operating conditions exceed corresponding thresholds. If at least one threshold is exceeded, the process 220 includes indicating an alarm as stage 230. If not, the process 220 proceeds to another decision stage 232 to determine if the process 220 should continue. If the process continues, process 220 reverts to querying SSD for operating conditions at stage 222; otherwise, the process ends.

Figure 7:
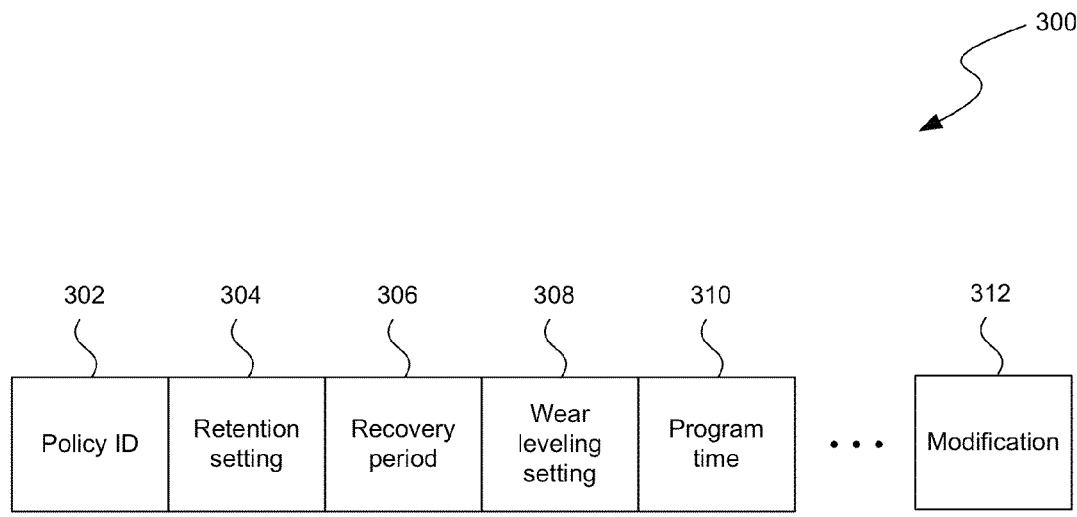
FIG. 7 is an example database schema illustrating an operation policy for an SSD in accordance with embodiments of the present technology.

FIG. 7 is an example database schema illustrating an operation policy for an SSD in accordance with embodiments of the present technology. In the illustrated embodiment, only the information pertaining to the operation policy is shown for clarity. For example, as shown in FIG. 7, an operation policy record 300 can include the following information: policy identification 302, a retention setting 304, a recover period 306, a wear leveling setting 308, a programming time 310, and a modification indicator 312. In other embodiments, the operation policy record 300 can also include historical data and/or other pertinent data (not shown).

Figure 8:
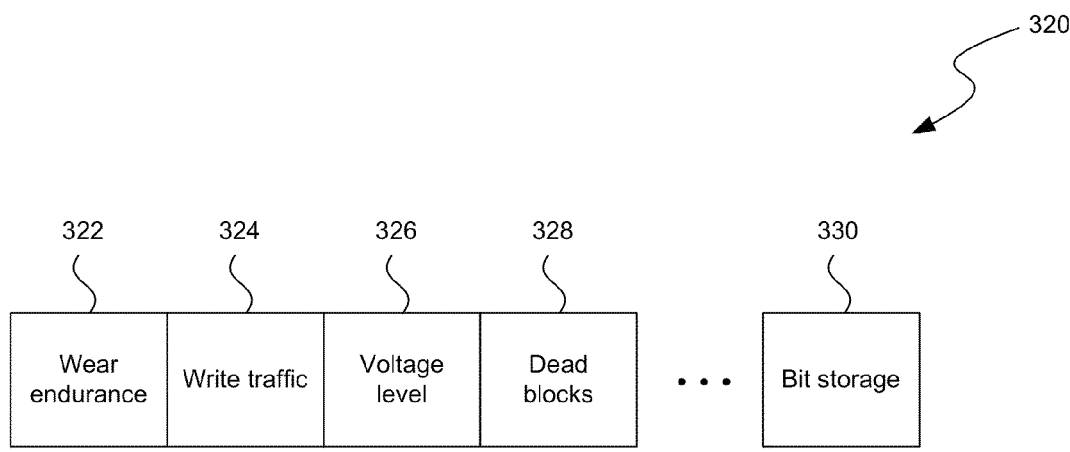
FIG. 8 is an example database schema illustrating a query response from an SSD in accordance with embodiments of the present technology.

FIG. 8 is an example database schema illustrating a query response from an SSD in accordance with embodiments of the present technology. In the illustrated embodiment, only the information pertaining to the query response is shown for clarity. For example, as shown in FIG. 8, a query response record 320 can include the following information: wear endurance 322, write traffic 324, voltage level 326, number of dead blocks 328, and bit storage mode 330. In other embodiments, the query response record 320 can also include historical data and/or other pertinent data (not shown).

Specific embodiments of the technology have been described above for purposes of illustration. However, various modifications may be made without deviating from the foregoing disclosure. In addition, many of the elements of one embodiment may be combined with other embodiments in addition to or in lieu of the elements of the other embodiments. Accordingly, the technology is not limited except as by the appended claims.

We claim:

1. A method performed by a computing device having a processor in communication with a solid state drive ("SSD"), the method comprising:
    with the processor,
        receiving a target operation profile for the SSD;
        determining a value of an operating parameter for the SSD based on (i) a tradeoff between at least two of an endurance, a retention, or a performance of the SSD and (ii) the received target operation profile, the operating parameter including at least one of a cell recovery time, a retention period, or a wear leveling setting;
        generating an instruction to set the determined value of the operating parameter for the SSD; and
        transmitting the generated instruction to the SSD for controlling operation of the SSD.

2. The method of claim 1, further comprising determining the target operation profile for the SSD based on a task performed by the processor of the computing device.

3. The method of claim 1, further comprising determining the target operation profile for the SSD based on a status of an application currently running on the computing device.

4. The method of claim 1, further comprising:
    determining if a task currently running on the computing device is a web search; and
    in response to determining that the task is a web search, set the target operation profile for the SSD to performance.

5. The method of claim 1, further comprising:
    determining if a task currently running on the computing device is a data backup; and
    in response to determining that the task is a data backup, set the target operation profile for the SSD to endurance.

6. The method of claim 1, further comprising:
    determining if an application currently running on the computing device is different from another application previously running on the computing device; and
    in response to determining that the application currently running on the computing device is different from the another application previously running on the computing device, adjusting the target operation profile for the SSD based on a status of the application currently running on the computing device.

7. The method of claim 1, further comprising:
    determining if an application currently running on the computing device is different from another application previously running on the computing device; and
    in response to determining that the application currently running on the computing device is different from the another application previously running on the computing device, adjusting the target operation profile for the SSD based on a status of the application currently running on the computing device without a human operator's request.

8. The method of claim 1 wherein receiving the target operation profile includes receiving the target operation profile via an application-programming interface.

9. The method of claim 1 wherein receiving the target operation profile includes receiving the target operation profile via a graphical user interface configured to interact with an operator.

10. A computing device, comprising:
    a processor in communication with a solid state drive ("SSD") and a memory containing instructions that when executed by the processor, cause the processor to perform a process including:

receiving a target operation profile for the SSD;

determining a value of an operating parameter for the SSD based on (i) a tradeoff between at least two of an endurance, a retention, or a performance of the SSD and (ii) the received target operation profile, the operating parameter including at least one of a cell recovery time, a retention period, or a wear leveling setting;

generating an instruction to set the determined value of the operating parameter for the SSD; and transmitting the generated instruction to the SSD for controlling operation of the SSD.

11. The computing device of claim 10 wherein the process performed by the processor further includes determining the target operation profile for the SSD based on a task performed by the processor of the computing device.

12. The computing device of claim 10 wherein the process performed by the processor further includes determining the target operation profile for the SSD based on a status of an application currently running on the computing device.

13. The computing device of claim 10 wherein the process performed by the processor further includes:
 determining if a task currently running on the computing device is a web search; and
 in response to determining that the task is a web search, set the target operation profile for the SSD to performance.

14. The computing device of claim 10 wherein the process performed by the processor further includes:
 determining if a task currently running on the computing device is a data backup; and
 in response to determining that the task is a data backup, set the target operation profile for the SSD to endurance.

15. The computing device of claim 10 wherein the process performed by the processor further includes:
 determining if an application currently running on the computing device is different from another application previously running on the computing device; and
 in response to determining that the application currently running on the computing device is different from the another application previously running on the computing device, adjusting the target operation profile for the SSD based on a status of the application currently running on the computing device.

16. A method performed by a computing device having a processor in communication with a solid state drive ("SSD"), the method comprising:

with the processor, monitoring a status of a task currently being performed by the processor of the computing device;

determining a value of an operating parameter for the SSD based on (i) a tradeoff between at least two of an endurance, a retention, or a performance of the SSD and (ii) the monitored status of the task currently performed by the processor, the operating parameter including at least one of a cell recovery time, a retention period, or a wear leveling setting;

generating an instruction to set the determined value of the operating parameter for the SSD; and transmitting the generated instruction to the SSD for controlling operation of the SSD.

17. The method of claim 16 wherein monitoring the status of the application includes:
 determining if the task is a web search; and
 in response to determining that the task is a web search, determining the value of the operating parameter for the SSD by favoring performance over endurance.

18. The method of claim 16 wherein monitoring the status of the application includes:
 determining if the task is a data backup; and
 in response to determining that the task is a data backup, determining the value of the operating parameter for the SSD by favoring endurance over performance.

19. The method of claim 16, further comprising:
 determining if the task currently running on the computing device is different from another task previously running on the computing device; and
 in response to determining that the task currently running on the computing device is different from the another task previously running on the computing device, adjusting the value of the operating parameter for the SSD based on the monitored status of the task currently running on the computing device.

20. The method of claim 16, further comprising:
 determining if the task currently running on the computing device is different from another task previously running on the computing device; and
 in response to determining that the task currently running on the computing device is not different from the another task previously running on the computing device, maintaining the value of the operating parameter for the SSD.

* * * * *